US010880430B2

(12) United States Patent
Woldahl et al.

(10) Patent No.: US 10,880,430 B2
(45) Date of Patent: Dec. 29, 2020

(54) SYSTEMS, METHODS, AND STORAGE MEDIA FOR TESTING LOCAL LOOPS OF TELECOMMUNICATIONS NETWORKS

(71) Applicant: Level 3 Communications, LLC, Broomfield, CO (US)

(72) Inventors: Thomas C. Woldahl, Phoenix, AZ (US); Erik V. Helfrich, Queen Creek, AZ (US); Michael J. Durkin, Littleton, CO (US); Larry J. North, Littleton, CO (US); Abid Khan, Castle Rock, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/680,275

(22) Filed: Nov. 11, 2019

(65) Prior Publication Data

US 2020/0162604 A1  May 21, 2020

Related U.S. Application Data

(60) Provisional application No. 62/768,589, filed on Nov. 16, 2018.

(51) Int. Cl.
| | | |
|---|---|---|
| *H04M 1/24* | (2006.01) | |
| *H04M 3/08* | (2006.01) | |
| *H04M 3/22* | (2006.01) | |
| *H04M 3/30* | (2006.01) | |
| *H04M 3/32* | (2006.01) | |
| *H04L 29/06* | (2006.01) | |
| *H04L 5/14* | (2006.01) | |
| *H04M 11/06* | (2006.01) | |

(52) U.S. Cl.
CPC ............ *H04M 3/30* (2013.01); *H04L 5/1438* (2013.01); *H04L 5/1476* (2013.01); *H04L 67/42* (2013.01); *H04M 3/323* (2013.01); *H04M 11/062* (2013.01)

(58) Field of Classification Search
None
See application file for complete search history.

(56) References Cited

U.S. PATENT DOCUMENTS

| | | | | |
|---|---|---|---|---|
| 6,292,468 | B1* | 9/2001 | Sanderson | H04M 3/30 370/241 |
| 2002/0089337 | A1* | 7/2002 | Lowell | H04B 3/46 324/612 |
| 2005/0069029 | A1* | 3/2005 | Afzal | H04M 3/22 375/222 |
| 2009/0161741 | A1* | 6/2009 | Ginis | H04M 3/304 375/224 |

* cited by examiner

*Primary Examiner* — Quoc D Tran

(57) ABSTRACT

Automatic testing/analysis of local loops of telecommunications networks includes obtaining bits-per-tone data for a local loop of a telecommunications network and generating a bit value string from the bits-per-tone data. The bit value string is then analyzed to determine whether it includes a bit pattern indicative of an impairment of the local loop. Further approaches for automatically testing local loops of telecommunications networks include obtaining attenuation data for multiple tones carried by the local loop and determining whether the attenuation data falls below thresholds for providing a service using the local loop.

16 Claims, 6 Drawing Sheets

FIG. 3

SYSTEMS, METHODS, AND STORAGE MEDIA FOR TESTING LOCAL LOOPS OF TELECOMMUNICATIONS NETWORKS

CROSS-REFERENCE TO RELATED APPLICATION

This application is related to and claims priority under 35 U.S.C. § 119(e) from U.S. Patent Application No. 62/768,589, filed Nov. 16, 2018, entitled "Systems, Methods, and Storage Media for Automatically Identifying Impairments in Local Loops of Telecommunication Networks," the entire contents of which is incorporated herein by reference for all purposes.

FIELD OF THE DISCLOSURE

The present disclosure relates to systems, methods, and storage media for automatically identifying impairments in local loops of telecommunications networks.

BACKGROUND

Copper-based telecommunications systems, such as digital subscriber line (DSL) systems, transmit information by sending electrical signals over a copper wire. Such systems may be used in conjunction with traditional telephone services and/or may make use of existing telephone lines from which telephone services have been migrated.

In general, copper-based telecommunications systems may include one or more modems or similar transceivers corresponding to end users (e.g., customers) of the telecommunications system. Each transceiver is typically connected by a wired connection, in what is typically referred to as a local loop, to a switch or similar piece of network equipment for receiving communications from the transceiver and transmitting the communications over a broader network backbone. In the context of DSL, for example, the transceiver associated with the end user is generally a DSL modem. The network equipment, to which the DSL modem is connected by the local loop, may be a DSL access multiplexer or "DSLAM". Each local loop may support multiple transceivers and a given DSLAM may be connected to multiple local loops.

Communication over the local loop generally includes transmitting data using a frequency division multiplexed signal consisting of multiple channels spread across a particular frequency band. Each channel is adapted to transmit, among other things, a respective carrier signal to which bits of data may be added for transmission between devices of the telecommunications network.

Various factors may affect the reliability, consistency, and quality of communications that occur over the local loop. For example, under certain operating conditions, a loss or reduction of the available frequency band or the number of bits transmitted over each channel may occur. Certain conditions may also result in, among other things, excessive noise on the line or other issues impacting the overall performance of the telecommunications network. In light of the foregoing, systems and methods for readily identifying and diagnosing such conditions in order that they may be remediated are desirable.

It is with these observations in mind, among others, that aspects of the present disclosure were conceived.

SUMMARY

One aspect of the present disclosure relates to a system configured for automatically identifying impairments in local loops of telecommunications networks. The system may include one or more hardware processors configured by machine-readable instructions to obtain bits-per-tone data for a local loop of a telecommunications network. The bits-per-tone data may include a plurality of tones and respective bit values for each of the plurality of tones. The processor(s) may be further configured to determine whether the bit value string includes a bit pattern indicative of an impairment in the local loop.

Another aspect of the present disclosure relates to a method for automatically analyzing local loops of telecommunications networks. The method includes obtaining bits-per-tone data for a local loop of a telecommunications network, the bits-per-tone data including a plurality of tones and respective bit values for each of the plurality of tones. The method further includes generating a bit value string from the bits-per-tone data, the bit value string including each of the bit values of the bits-per-tone data. The method also includes determining whether the bit value string includes a pattern indicative of an impairment in the local loop.

Yet another aspect of the present disclosure relates to a tangible, non-transitory computer-readable storage medium having instructions encoded thereon, the instructions, when executed by a processor, are operable to obtain bits-per-tone data for a local loop of a telecommunications network, the bits-per-tone data including a plurality of tones and respective bit values for each of the plurality of tones. The instructions are further operable to generate a bit value string from the bits-per-tone data, the bit value string including each of the bit values of the bits-per-tone data and to determine whether the bit value string includes a bit pattern indicative of an impairment in the local loop.

In another aspect of the present disclosure, a system for automatically testing local loops of telecommunications networks is provided. The system includes one or more hardware processors configured by machine-readable instructions to obtain attenuation data collected by a computing device that is communicatively coupleable with a local loop of a telecommunications network. The attenuation data includes a first attenuation value for a first tone carried by the local loop that indicates attenuation for the first tone and a second attenuation value for a second tone carried by the local loop that indicates attenuation for a second tone. The system further obtains a first attenuation threshold for the first tone and a second attenuation for the second tone. The first attenuation threshold indicates an allowable attenuation for the first tone for providing a service over the local loop and the second attenuation threshold similarly indicates an allowable attenuation for the second tone for providing the service over the local loop. The system then determines whether at least one of the first attenuation value exceeds the first attenuation threshold or the second attenuation value exceeds the second attenuation threshold.

In still another aspect of the present disclosure, a method of automatically testing local loops of telecommunications networks is provided. The method includes obtaining attenuation data collected by a computing device that is communicatively coupleable with a local loop of a telecommunications network, the attenuation data including a first attenuation value for a first tone carried by the local loop and a second attenuation value for a second tone carried by the local loop that indicates attenuation for a second tone. The method further includes obtaining each of a first attenuation threshold for the first tone indicating an allowable attenuation for the first tone for providing a service over the local loop and a second attenuation threshold for the second tone, the second attenuation threshold indicating an allowable attenuation for the second tone for providing the service over the local loop. The method then includes determining whether at least one of the first attenuation value exceeds the first attenuation threshold or the second attenuation value exceeds the second attenuation threshold.

In yet another aspect of the present disclosure, a tangible, non-transitory, computer-readable media having instructions encoded thereon is provided. The instructions, when executed by a processor are operable to obtain attenuation data collected by a computing device that is communicatively coupleable with a local loop of a telecommunications network. The attenuation data includes a first attenuation value for a first tone carried by the local loop that indicates attenuation for the first tone and a second attenuation value for a second tone carried by the local loop that indicates attenuation for a second tone. The instructions are further operable to obtain each of a first attenuation threshold for the first tone and a second attenuation for the second tone. The first attenuation threshold indicates an allowable attenuation for the first tone for providing a service over the local loop and the second attenuation threshold similarly indicates an allowable attenuation for the second tone for providing the service over the local loop. The instructions are further operable to determine whether at least one of the first attenuation value exceeds the first attenuation threshold or the second attenuation value exceeds the second attenuation threshold.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

FIG. 3 is an example block of bits-per-tone data.

DETAILED DESCRIPTION

Aspects of the present disclosure involve systems and methods for monitoring local loops in a copper-based telecommunications system and identifying impairments in such local loops that may negatively impact the performance of the telecommunications system. In certain implementations, such systems may be implemented, at least in part, at a local loop testing system in communication with one or more network devices including, without limitation, digital subscriber line (DSL) access multiplexers (DSLAMs), or portable testing equipment. During operation, the local loop testing system is configured to obtain bits-per-tone data from a local loop and to analyze the bits-per-tone data for particular patterns indicative of various impairments that may be present on the local loop. For example and without limitation, such impairments may include alien ingress, a bridge tap, a noise floor above a particular threshold value, and/or upstream pressure. In one example implementation, the analysis by the local loop testing system is performed, in part, by converting the bits-per-tone data into a string and comparing or otherwise testing the string against a template that includes bit patterns indicative of the various impairments.

Although the systems and methods discussed herein are primarily described as being implemented using a local loop testing system, some or all of the functionality for testing impairments may alternatively be implemented within network devices (e.g., within a DSLAM), testing equipment, or any other computing device arranged to perform the operations described herein. Accordingly, to the extent any steps, operations, etc. are described as being performed by the local loop testing system, it should be understood that such functionality may be executed more generally by one or more devices within or coupleable to a network or that may otherwise have access to the performance data underlying the impairment identification approaches discussed herein.

Figure 1:
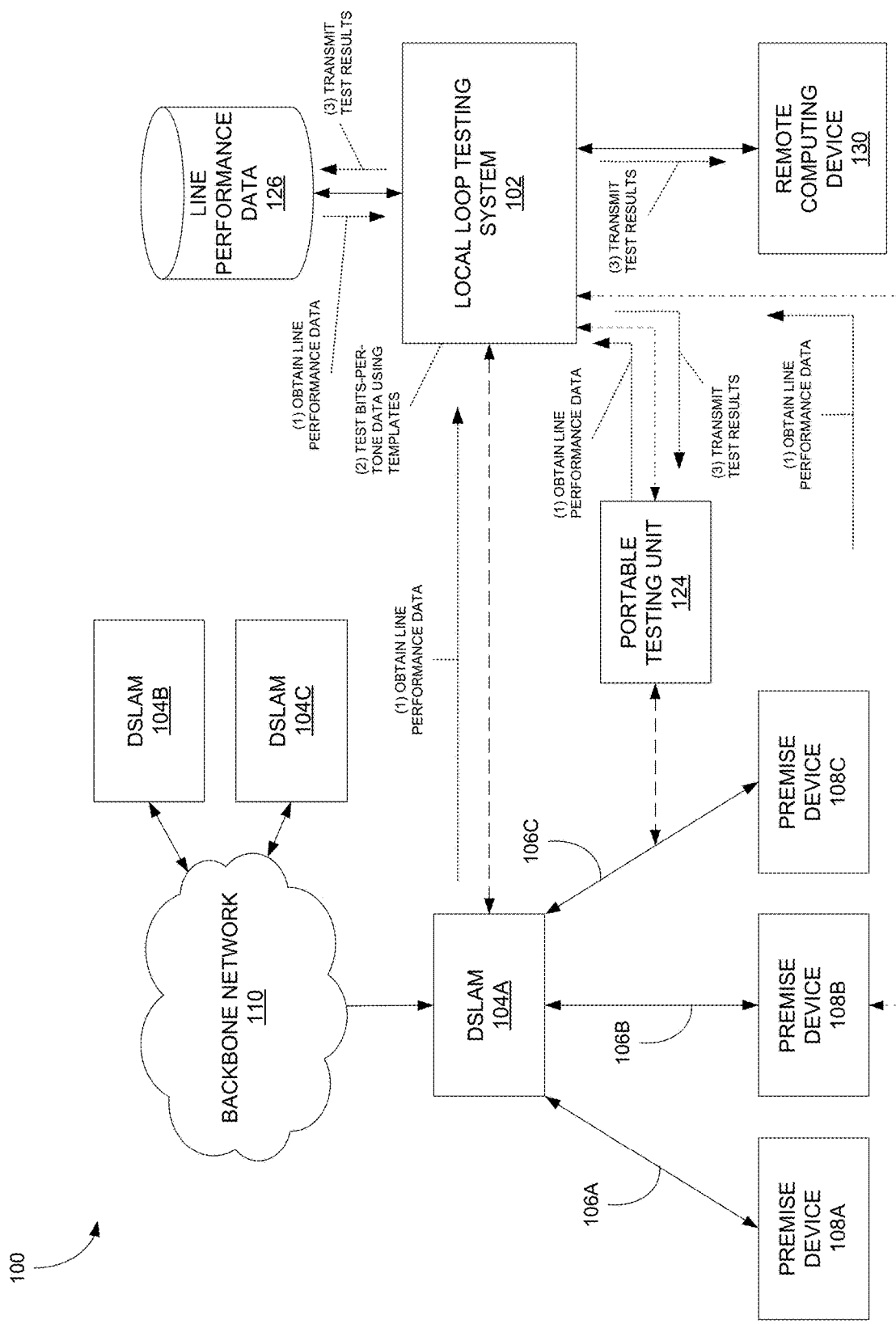
FIG. 1 illustrates a system configured for automatically identifying impairments in local loops of telecommunications networks, in accordance with one or more implementations.

FIG. 1 illustrates a network environment 100 according to one or more implementations of the present disclosure. The network environment 100 includes an local loop testing system 102 configured to automatically identifying impairments in circuits of telecommunications networks, such as local loops, based on line performance data for the circuits. Although implementations of the present disclosure are generally applicable to telecommunications networks having any suitable configuration, the network environment 100 of FIG. 1 is provided as an example to lend context to the following discussion. Accordingly, the network environment 100 should be considered as one example environment within which aspects of the present disclosure may be implemented and should not be viewed as limiting.

As illustrated, the network environment 100 includes a backbone network 110 in communication with multiple bridge devices, namely, digital subscriber line (DSL) access multiplexers (DSLAMs) 104A-104O. In general, DSLAMs 104A-104O facilitate communication between the high-speed backbone network 110 and local loops of the telecommunications network, such as local loops 106A-106O, which are shown as being in communication with DSLAM 104A. More specifically and with reference to DSLAM 104A, the DSLAM 104A collects and combines traffic from network devices, such as premise devices 108A-108O, connected to the local loops 106A-106O for transmission over the backbone network 110 and distributes traffic received from the backbone network 110 to the appropriate local loops 106A-106O.

While the network environment 100 of FIG. 1 illustrates only three DSLAMs 104A-104O, it should be understood that any suitable number of DSLAMs may be in communication with the backbone network 110. Similarly, each DSLAM may be connected to any number of local loops, each of which may be connected to a respective premise device. For example, DSLAMs 104B and 104C may be coupled to one or more respective local loops; however, for clarity, such local loops are omitted from FIG. 1. Moreover, it should be further appreciated that implementations of the present device are not necessarily limited to those including DSLAMs as bridge devices. Rather, as discussed below, implementations of the present device are directed to analyzing and assessing impairments on the local loops 106A-106O. Accordingly, implementations of the present disclosure may include any suitable bridge device for connecting one or more local loops or similar circuits to another network.

A given local loop may be or may become subject to one or more impairments that may negatively impact, bandwidth of the local loop, transmission speed, data quality, and the like. Accordingly, each local loop may be periodically tested to determine whether any such impairments are present. One approach to detecting such impairments is to sample and analyze bits-per-tone data for the local loop. Bits-per-tone data refers to analysis data indicating the number of bits carried by each available tone of the local loop, with each tone corresponding to a range of the total bandwidth of the local loop. For example, in certain applications, each tone may correspond to approximately 4.3 kHz and may carry up to 15 bits. Various impairments affect the bits-per-tone data differently, e.g., by creating gaps or patterns in adjacent frequency bands of the bits-per-tone data. Accordingly, by examining the bits-per-tone data and identifying impairment-related patterns within the bits-per-tone data, impairments may be identified and classified and corresponding remedial actions (e.g., line repairs, equipment replacement, etc.) may be initiated.

Figure 2:
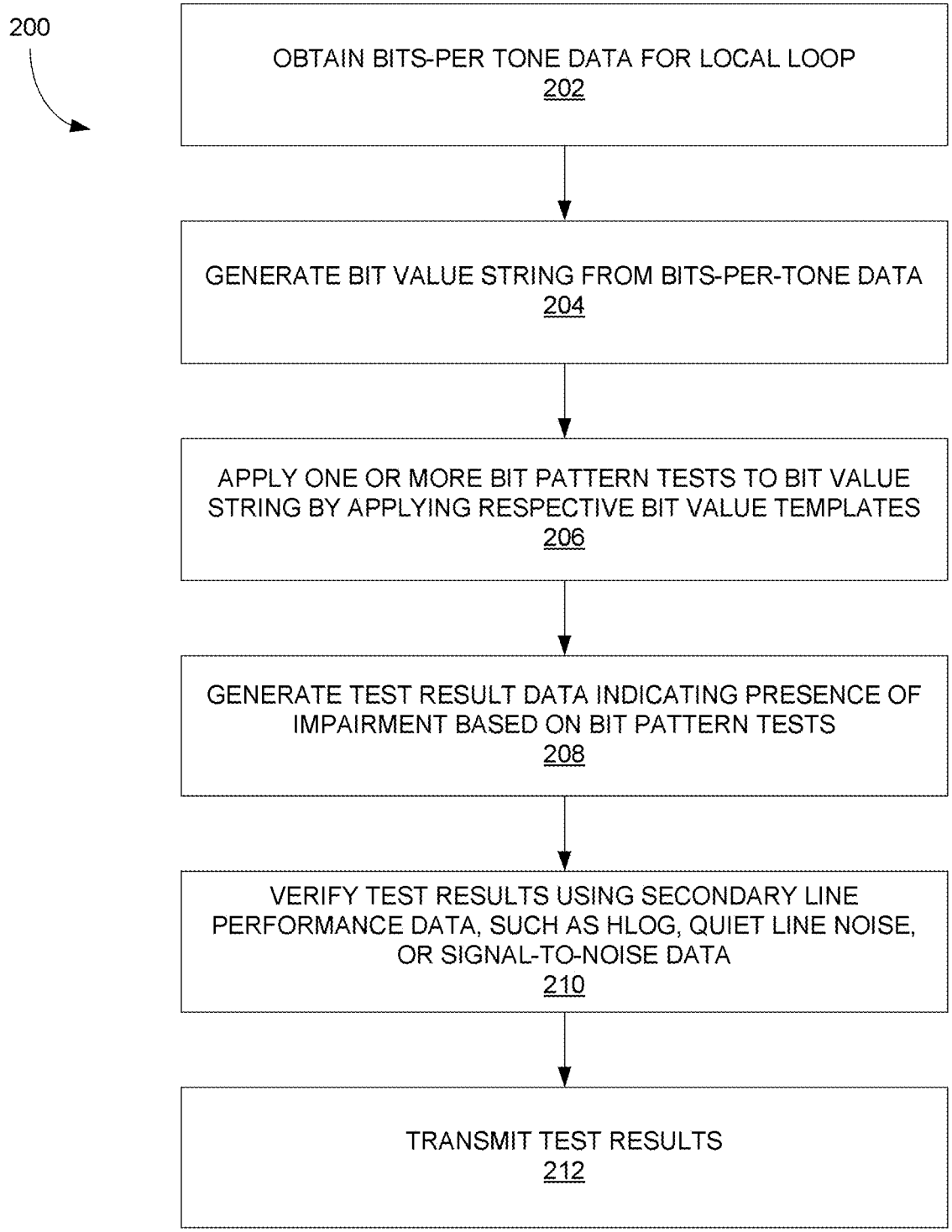
FIG. 2 illustrates a method for automatically identifying impairments in local loops of telecommunications networks, in accordance with one or more implementations.

FIG. 2 is a flow chart illustrating a method 200 for detecting impairments in local loops of telecommunications networks in accordance with the present disclosure. In general, the method 200 involves collecting, processing, and analyzing bits-per-tone data for local loops to identify bit patterns indicative of particular impairments affecting the local loops. To provide context, the method 200 is described below with reference to the network environment 100 of FIG. 1 and, more specifically, is described in the context of testing the local loops 106A-106O. Nevertheless, it should be appreciated that the method 200 may generally be applied for testing any link or circuit of a network for which bit-per-tone data may be collected.

At operation 202, the local loop testing system 102 obtains line performance data including bits-per-tone data for one or more local loops 106A-106O. Bits-per-tone data may be collected using various techniques. In general, the local loop testing system 102 obtains the line performance data either directly from devices within the network environment 100, from testing devices in communication with the local loop testing system 102, or from a data source of historical line performance data (e.g., line performance data source 126). For example, in certain implementations, the DSLAM 104A may be configured to periodically collect bits-per-tone data for one or more of the local loops 106A-106C connected to the DSLAM 104A. The collected line performance data may then be transmitted to the local loop testing system 102 for storage in a line performance data source 126. Alternatively, the collected line performance data may be transmitted and stored in the line performance data source 126 for subsequent access by the local loop testing system 102 by the DSLAM 104A or one or more other computing systems in communication with the DSLAM 104. In still other implementations, the bits-per-tone data may be collected and provided to the local loop testing system 102 (or other computing system for storage in the line performance data source 126) by a portable testing unit 124 capable of obtaining bits-per-tone data from the local loops 106A-106O. In other implementations, a premise device (e.g., premise device 108B) capable of collecting bits-per-tone data for the local loop (e.g., local loop 106B) may provide the bits-per-tone data to the local loop testing system 102 (or a data source accessible by the local loop testing system 102.

In addition to bits-per-tone data, the line performance data corresponding to the local loops 106A-106O may include other data that may be used by for subsequent access by the local loop testing system 102 to further test and verify the performance of the local loops 106A-106C. By way of non-limiting example, such additional data may include at least one of H log data, quiet line noise data, and signal-to-noise ratio data. Similar to the bits-per-tone data, such additional data may be collected and made available to the local loop testing system 102 by one or more devices such as, but not limited to, the DSLAM 104A, the portable testing unit 124, and premise devices 108A-108O.

The line performance data obtained in operation 202 may be in various forms and formats based on the type of device collecting the line performance data and/or the approach used to store the line performance data. In general, however, the line performance data includes bits-per-tone data that indicates a quantity of bits for each of a series tones. Accordingly, the bits-per-tone data may be stored and retrieved as an array, table, string, or similar data structure from which bit counts for specific tones may be identified. In certain implementations, the line performance data including the bits-per-tone data may be in a comma-separated value (CSV) file or similar tabular file format. In other implementations, the line performance data may be received as an extensible markup language (XML) file or similar format that similarly facilitates identification and extraction of particular data from the file by including specific fields identifying particular type of data.

In certain implementations, obtaining the line performance data may include transmitting a request for line performance data from the local loop testing system 102 to a network device capable of collecting such information for a local loop. For example, in the network environment 100, the local loop testing system 102 may transmit a request for line performance data for one, multiple, or all local loops to DSLAM 104A. In response, the DSLAM 104A may transmit one or more corresponding response messages, including the requested line performance data, to the local loop testing system 102.

In certain implementations, the request message from the local loop testing system 102 may be configured to cause the receiving network device to initiate a line performance test and to collect line performance data, including bits-per-tone data. In other implementations, the network device may be configured to periodically sample or otherwise collect line performance data independent of a specific request from the local loop testing system 102. In such implementations, in response to receiving a request form the impairment testing system 102, the network device may provide the most recently collected line performance data to the local loop testing system 102.

Subsequent to obtaining the line performance data, the local loop testing system 102 generates a bit value string from the bits-per-tone data (operation 204). For example, in certain implementations, the local loop testing system 102 may concatenate the bits-per-tone data into a string of consecutive hexadecimal values with each value corresponding to the number of bits for a respective tone. Accordingly, the bit value string generally includes each of the bit values of the bits-per-tone data by tone frequency in sequential order.

For example, as previously noted, the bits-per-tone data may include the quantity of bits (e.g., up to 15) for each of a plurality of consecutive tones at 4.3 kHz intervals. In such an implementation, a set of ten consecutive 4.3 kHz intervals may result in counts of 9, 10, 9, 8, 12, 14, 12, 10, 9, and 6 bits, respectively. Accordingly, to generate the bit value string, the local loop testing system 102 may receive the bit counts and may convert and store the bit counts as a string. Using the foregoing example sequence of bits, the local loop testing system 102 would generate the bit value string "9A98CECA96".

The local loop testing system 102 may then test the bit value string using one or more bit value templates (operation 206) and generate a corresponding test result (operation 208). In general, the one or more bit value templates facilitate identification of a bit value pattern indicative of an impairment within the bit value string. For example and without limitation, the bit value template may be in the form of a search string, regular expression, or similar search or character pattern that may be compared to the bit value string to determine if at least a portion of the bit value string conforms to the search pattern. More generally, the bit value template may be any sequence or pattern of bit values that the local loop testing system 102 is configured to identify within the bit value string. Accordingly, a test result generated by the local loop testing system 102 for a given bit value template may indicate whether at least a portion of the bit value string conforms to the bit value template (e.g., includes the sequence of bit values represented by the bit value template). For example, a "positive" test result may indicate that at least a portion of the bit value string conforms to the bit value template while a "negative" result may indicate that the bit value string does not include the pattern or sequence of bits represented by the bit value template. In certain implementations, testing of the bit value string may include applying multiple bit value templates to the bit value string and generating multiple test results. For example, each of the multiple bit value templates and test results may correspond to a different type of impairment. By way of non-limiting example, such impairments may include one or more of alien ingress, a bridge tap, mixed technology connected to the local loop, a noise floor above a threshold value, or upstream pressure.

In one example, the local loop testing system 102 may test the bit value string using a bit value template for identifying alien ingress. In at least certain cases, alien ingress may be identified by bands within the bits-per-tone data for which zero bits are received. So, for example, a bit value template for testing for alien ingress may check for portions of the bit value string in which a series of tones having relatively high bit counts (e.g., four or greater) is followed by a band of one or more tones having a bit count of zero, followed by a subsequent band of tones for which relatively high bit counts are again observed.

As another example, the local loop testing system 102 may test the bit value string using a bit value template for identifying bridge taps. In at least certain cases, bridge taps may be identified by bands of the bits-per-tone data in which the bit counts for successive tone ranges decrease over a first band of tones and then increase over a second, consecutive band. When plotted in a bits-per-tone graph, for example, the bridge tap may appear as consecutive series or steps in opposite directions (e.g., a set of downward or upward steps followed by a corresponding set of upward or downward steps, respectively) or stepped crenellations. Accordingly, a search pattern for identifying bridge taps may be configured to identify portions of the bits-per-tone data in which the bit count decreases in a step-like fashion over a first band and then increases in a similar step-like fashion over a second, adjacent band.

As still another example, the local loop testing system 102 may test the bit value string using a bit value template for identifying mixed technology. For purposes of this disclosure, mixed technology generally refers to instances in which the same local loop provides services using multiple, disparate technologies (e.g., a ADSL with ADSL2 or VDSL technologies). Among other things, identification of mixed technology impairments enables an operator to identify old or obsolete technology within a network and for which replacement with newer, improved technology may result in a better overall customer experience. In at least certain cases, mixed technology may be identified from the bits-per-tone data using a search pattern that identifies increasing bits-per-tone values over a range of relatively low-frequency tones. For example, mixed technology may be identified by a search pattern that identifies a gradual increase in the bits-per-tone values over the first 256 bins of the bits-per-tone data (e.g., the bits-per-tone measured for tone frequencies up to approximately 1.1 MHz).

In yet another example, the local loop testing system 102 may test the bit value string using a bit value template for identifying upstream pressure. For purposes of this disclosure, upstream pressure refers to instances in which data is transported upstream using bands that are not generally intended for such data transport. As discussed below in further detail, tones carried by a local loop may be divided into multiple bands dedicated to upstream and downstream data transport. For example, a VDSL circuit may include at least three bands for upstream data transport (e.g., U0, U1, U2) with only two such bands (e.g. U1, U2) providing the primary data transport. To the extent the third band (e.g., U0) is used, such overflow may be the result of attenuation of the circuit in one of the other two bands. In at least certain cases, upstream pressure may be identified using a search pattern that identifies a sudden increase in bits-per-tone values across a small band. For example and without limitation, in at least one implementation, the local loop testing system 102 may identify the presence of upstream pressure by using a search pattern that identifies a first band where each tone has zero bits, a second band (e.g., of approximately 10-30 tones) immediately following the first band for which the bits-per-tone data exceeds a predetermined value (e.g., 5 bits), and a third band immediately following the second band where each tone again has zero bits. It should be appreciated that the length of each of the bands and the predetermined value used in the search pattern may vary in different implementations of the present disclosure. Among other things, the definitions of the bands may vary depending on the technology implemented using the local loop (e.g., ADSL, VDSL, VDSL2, etc.) and their respective band definitions. It should also be appreciated that certain technologies (e.g., VDSL) may support multiple band definitions/configurations. In such cases, the search pattern may also vary or otherwise be dependent on the particular configuration for the technology.

In another example, the local loop testing system 102 may test the bit value string using a bit value template for identifying a noise floor. A noise floor generally refers to when erroneous background transmissions emitted by other devices or sources create interference on frequencies carried over the local loop. In general, a noise floor may be identified by one or more bands in the bits-per-tone data for which each tone has a relatively low bits-per-tone value. For example, in at least certain cases, a noise floor may be considered to be present when each tone of the bits-per-tone data for a band of approximately 2.5-3.5 MHz is seven bits or less. Nevertheless, it should be appreciated that the width of the band, the number of bits used for the threshold, or similar aspects of the bit pattern may vary in implementations of this disclosure. Among other things, the width or range of the band tested using the search pattern may depend on defined bands for the particular data transport technology implemented using the local loop. In such instances, the search pattern may be used to test for a noise floor within a specific upstream or downstream band as defined for the data transport technology. As another example, the threshold number of bits for identifying a noise floor for the search pattern may vary based on a desired quality of service/speed for the local loop and, as a result, the necessary sensitivity to noise on the local loop.

Figure 3:
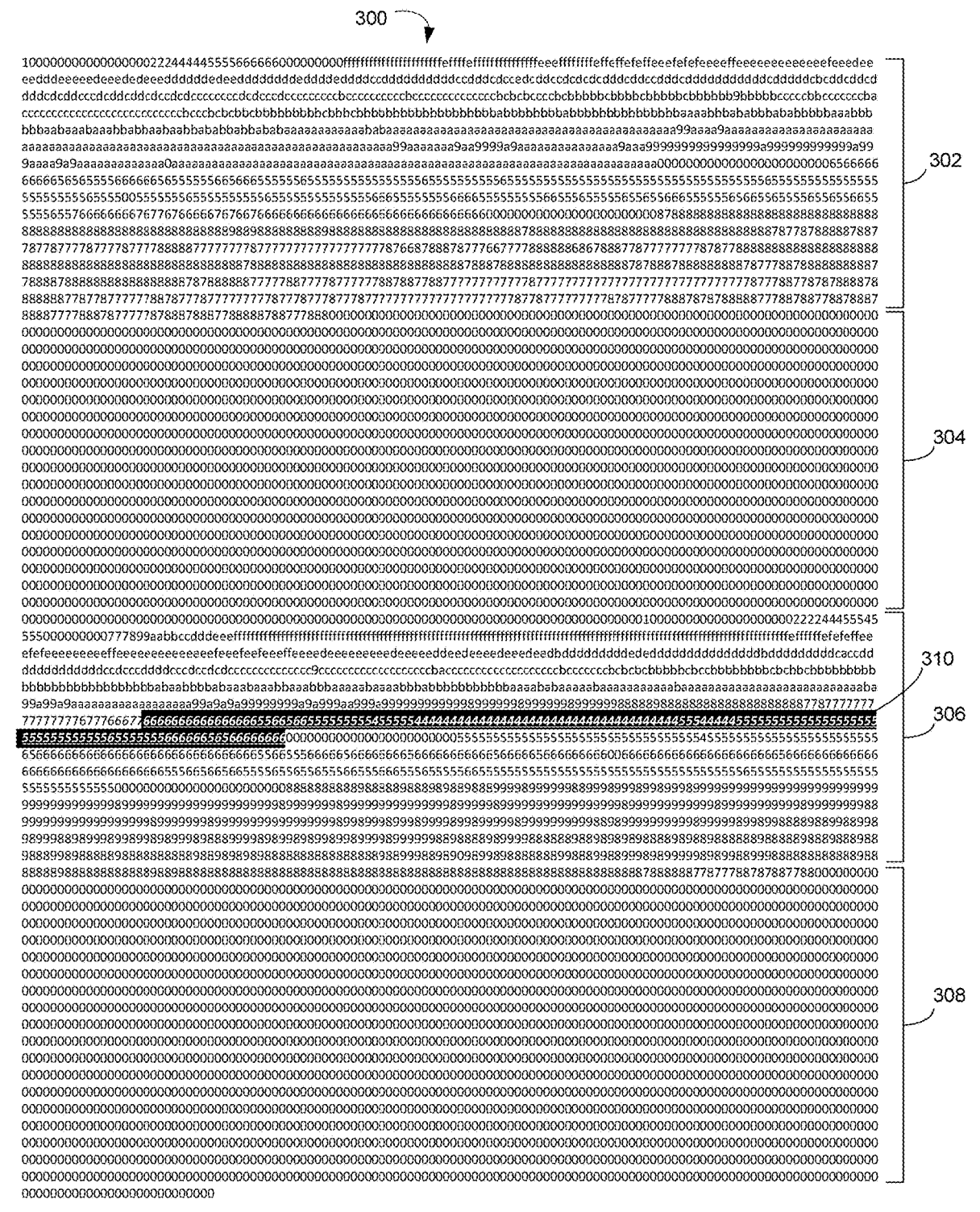

To illustrate the general complexity of identifying patterns within hexadecimal representations of bits-per-tone data, an example of such data for an example loop is provided in FIG. 3. More specifically, FIG. 3 is a block of bits-per-tone data 300 that has been converted into hexadecimal values for analysis (e.g., as may be produced in operation 204, above). Each digit of the block 300 corresponds to the number of measured bits for a tone spanning approximately 4.3 kHz. Accordingly, when read from left-to-right and top-to-bottom, the bits-per-tone block 300 provides the number of bits carried by each 4.3 kHz tone supported by the loop.

As illustrated in FIG. 3, the block 300 includes a first portion 302 of non-zero values corresponding to a first downstream frequency band (e.g., a "D1" band), a first portion 304 of zeroes corresponding to a first upstream frequency band (e.g., a "U1" band), a second portion 306 of non-zero values corresponding to a second downstream frequency band (e.g., a "D2" band), and a second portion 308 of zeroes corresponding to a second upstream frequency band (e.g., a "U2" band). Accordingly, the block 300 generally corresponds to bits-per-tone data obtained during a downstream test of the loop; however, it should be appreciated that the systems and method disclosed herein may be used to identify impairments in any frequency band of the loop.

The block 300 indicates an impairment in the form of a bridge tap. More specifically, the block 300 indicates a bridge tap 310 within the second downstream band (D2). For clarity, the bridge tap 310 is highlighted. As noted above, bridge taps may be identified by a step-wise decrease followed by a step-wide increase (or vice-versa) in the number of bits-per-tones measured over successive tones. In the case of the bridge tap 310, such a pattern is evidenced by the values of the bits-per-tone data generally decreasing then subsequently increasing. More specifically, the portion of the block 300 corresponding to the bridge tap 310 includes a series of sixes, followed by a series including a mixture of fives and fours, which in turn is followed by a series of fours. The values then increase back up to a mix of fours and fives, followed by a series that is predominantly fives, which in turn is followed by a series of tones that is predominantly sixes, before subsequently increasing back to a consecutive series of sixes.

Figure 4:
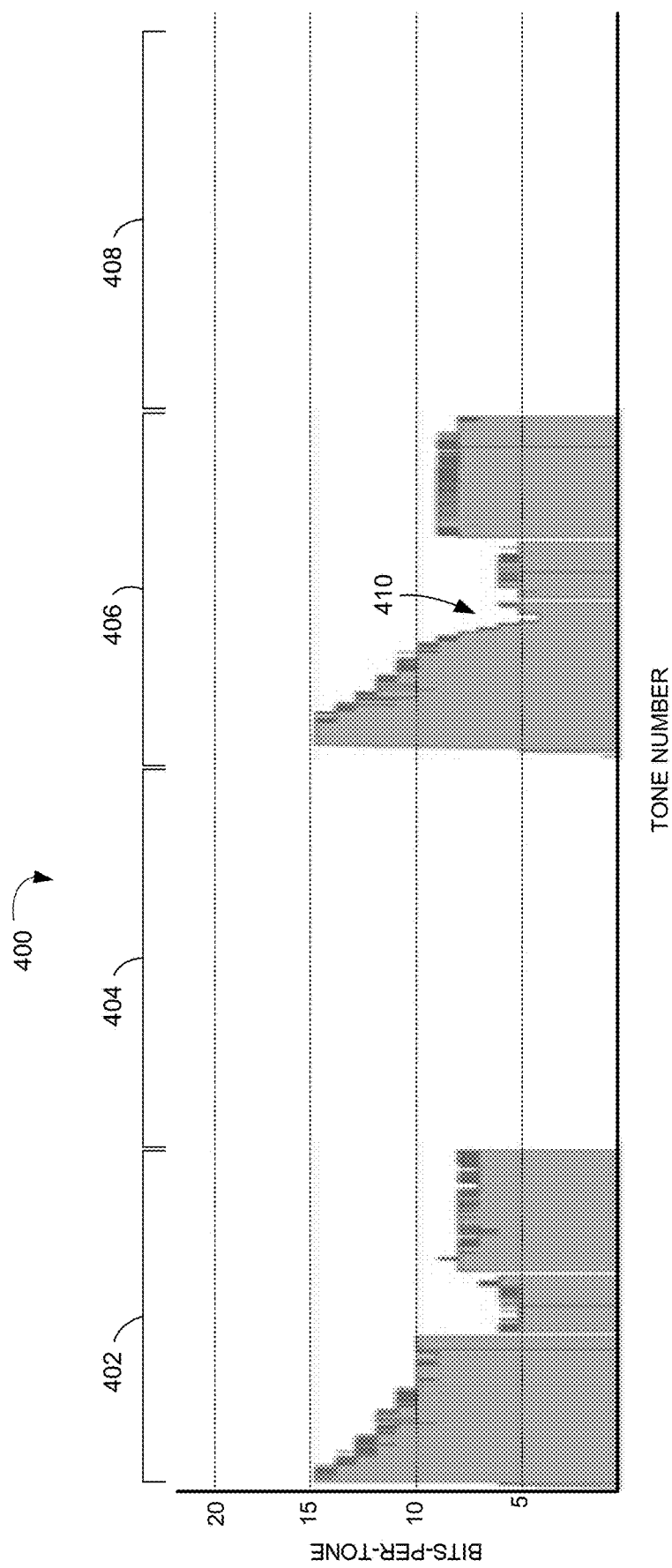
FIG. 4 is a graphical representation of the example block of bits-per-tone data of FIG. 3.

To further illustrate the bridge tap 310 identified in FIG. 3, a graphical representation 400 of the block 300 of FIG. 3 is provided in FIG. 4. As illustrated, the graphical representation 400 includes a first downstream section 402 corresponding to the D1 band, a first upstream section 404 corresponding to the U1 band, a second downstream section 406 corresponding to the D2 band, and a second upstream section 408 corresponding to the U2 band. The bridge tap 310 is identified by reference 410 and, as noted above, appears as a series of downward steps followed by upward steps in the visual representation.

As illustrated in the block 300 of FIG. 3 and the graphical representation 400 of FIG. 4, various aspects of the "steps" used in identifying a bridge tap may vary. For example, the width of each step (e.g., the number of tones included in a given step) may vary. In such cases, the search pattern for identifying a bridge tap may be configured to identify steps of varying sizes (e.g., to identify steps that are anywhere from 10-50 tones in width). As another example, each tone within a given step may have a constant bits-per-tone value; however, in certain instances, a given step may have a predominant value (e.g., 4) but may nevertheless include tones having bits-per-tone values that are higher or lower than the predominant value.

The local loop testing system 102 may also be configured to perform secondary verification (operation 210) of the test results generated in operation 208. Secondary verification may be performed, for example, by analyzing additional data and metrics included in the line performance data. Such additional data may include, among other things, H log data, quiet line noise (QLN) data, and signal-to-noise ratio (SNR) data. Notably, the foregoing approach of identifying impairments using bits-per-tone data is inherently dynamic in that the bits-per-tone data is based on the specific time at which the bits-per-tone data is acquired from the local loop. In at least certain implementations, the secondary data may instead reflect a static state of the local loop and, as a result, be used to complement the dynamic bits-per-tone data. By doing so, impairments identified by the bits-per-tone data may be confirmed or recharacterized using the secondary data. In one specific example, certain sources of interference on a local loop (e.g., AM radio, cell towers, aircraft radios, ham radios, etc.) may vary based on time of day and may result in different bits-per-tone data depending on when the bits-per-tone data is collected. In such cases, the characteristics of the interference at the time of sampling the bits-per-tone data may cause the bits-per-tone data to exhibit one type of impairment (e.g., a bridge tap) when in fact a second type of impairment (e.g., an alien ingress) is present. The secondary data may then be used to verify whether a particular type of impairment is actually present. For example, in instances where the bits-per-tone data exhibits a bridge tap, QLN or H log data may be used to verify whether a bridge tap is actually present (e.g., as indicated by a characteristic "bounce" in the QLN or H log data) or if the results of analyzing the bits-per-tone data is instead the result of alien ingress (e.g., as indicated by spikes or similar characteristic changes at frequencies corresponding to common sources of interference).

Following generation of the test results in operation 208 and secondary verification 210, the local loop testing system 102 may transmit the test results (or a summary thereof) to one or more computing devices (operation 212). In certain implementations the local loop testing system 102 may be configured to transmit the test results to the portable testing unit 124 and the portable testing unit 124 may be configured to automatically display the test results when received. For example, in one implementation, a field technician or similar user may use the portable testing unit 124 to probe the local loop 106C and collect line performance data including bits-per-tone data directly at the portable testing unit 124. Alternatively, the portable testing unit 124 may be communicatively coupled to the DSLAM 104A and may be use to initiate collection of the line performance data by the DSLAM 104A. In either case, the line performance data may then be transmitted to the local loop testing system 102 where the bits-per-tone data may be tested to identify impairments in the local loop 106C, as discussed above. The results of such testing may then be transmitted back to the portable testing unit 124 by the local loop testing system 102 and presented on a display of the portable testing unit 124 or otherwise made available through the portable testing unit 124.

In certain implementations, the local loop testing system 102 may also be configured to transmit one or more of the test results or a summary thereof to another computing device (e.g., remote computing device 130) communicatively coupled to the local loop testing system 102. For example, the remote computing device 130 may correspond to a network operations center from which the network environment 100 may be monitored and controlled. In such implementations, the local loop testing system 102 may also be configured to receive and execute commands from the remote computing device. For example, in one implementation, the remote computing device 130 may transmit instructions to the local loop testing system 102 to initiate testing of one or more local loops. In response, the local loop testing system 102 may coordinate testing, collection, and analysis of line performance data, such as by engaging in communication with one or more devices in the network environment 100 capable of collecting line performance data, as discussed above.

In still other implementations, the local loop testing system 102 may be configured to transmit the test results for storage, e.g., in the line performance data source 126. Test result data may be stored along with other information, such as network architecture or geographic information to facilitate further analysis and diagnostics of the network environment 100. For example, test results for a given local loop may be stored with geographic information associated with the local loop, such as the location of the local loop. Such information may then be used to generate maps in which the status of each local loop (e.g., whether or not impairments are present) is visually indicated, such as by color-coding lines on the map corresponding to the local loops. As another example, test results may be grouped/correlated and analyzed based on geographic or logical address information to facilitate identification of potential impairments in related local loops, to provide statistical information regarding related local loops, and the like.

As discussed above, implementations of the present disclosure may be used to identify particular impairments in local loops of telecommunications networks. In other aspects of the present disclosure, methods and systems according to the present disclose may also (or alternatively) be used to test overall performance of local loops based on attenuation. Such tests may be used to identify, among other things, whether an impairment may be present, whether a local loop is currently providing a certain bitrate, whether a local loop is capable of supporting additional connections or increased bit rates, and the like.

General condition and transport capacity of a local loop may be tested, in part, by measuring attenuation for the local loop. For purposes of this disclose, attenuation generally refers to signal loss or degradation over the local loop and is often expressed in units of decibels (dB) lost. In general, the greater attenuation over a local loop, the lower the transport capacity of the local loop. While some attenuation is inherently caused by the type and length of the transmission medium of the local loop, impairments (such as those discussed above) and other similar factors may result in attenuation above and beyond that which may be inherent to the local loop. As a result, the general condition of the local loop can be analyzed by comparing measured attenuation for the local loop with corresponding benchmarks (e.g., attenuation for an idealized loop having no impairments), To test the transport capacity of a given local loop, attenuation may be measured at a predetermined test frequency (e.g., 196 kHz). The measured attenuation value at the test frequency may then be compared with a benchmark to determine whether the attenuation at the test frequency falls outside of acceptable an acceptable range. Relying on attenuation at only one frequency can be problematic for various reasons. Among other things, modern DSL lines often have the capacity to carry over 4000 distinct tones extending over a wide frequency spectrum. Accordingly, measuring attenuation for one tone only represents a very small sample size that is unlikely to accurately and fully represent attenuation characteristics of a given local loop over its full bandwidth. Moreover, as noted above in the context of identifying local loop impairments, certain impairments may cause losses in a limited frequency band and, as a result, would not be readily identified by measuring attenuation for a tone outside the particular frequency band associated with the impairment.

In light of the foregoing, implementations of the present disclosure include systems and methods for testing local loops based on measured attenuation values for multiple tones carried over a local loop. Based on the results of such testing, the systems and methods described herein may be used to detect impairments in the local loops, evaluate the transport capacity of the local loops (e.g., for verifying existing services meet specified performance levels or to identify services that may be provided over a given local loop), and perform other similar analyses.

Implementations of the present disclosure collect attenuation (e.g., dB loss) data for multiple tones carried on a local loop. Each attenuation value is then compared to a respective attenuation threshold for the corresponding tone. Although the attenuation thresholds may vary in applications of the present disclosure, in at least certain implementations, the attenuation thresholds may be maximum allowable attenuations for the measured tones. Such maximum allowable thresholds may be based on, among other things, target upstream/downstream bit rates for providing a service (e.g., a service currently provided to a customer or potentially available to a customer), a line type of the local loop, a distance to customer premises, and other similar factors.

In other implementations, the attenuation thresholds may correspond to previously measured attenuation values for the local loop. For example, following installation, upgrading, maintenance, etc., on a local loop (or at any other suitable time), attenuation values may be collected for the local loop and stored as a "baseline" against which subsequently collected attenuation values may be compared. In such implementations, comparing the historical attenuation values to current attenuation values can be used to identify degradation, damage, or other issues associated with the local loop that may impact one or more services provided by the local loop.

Figure 5:
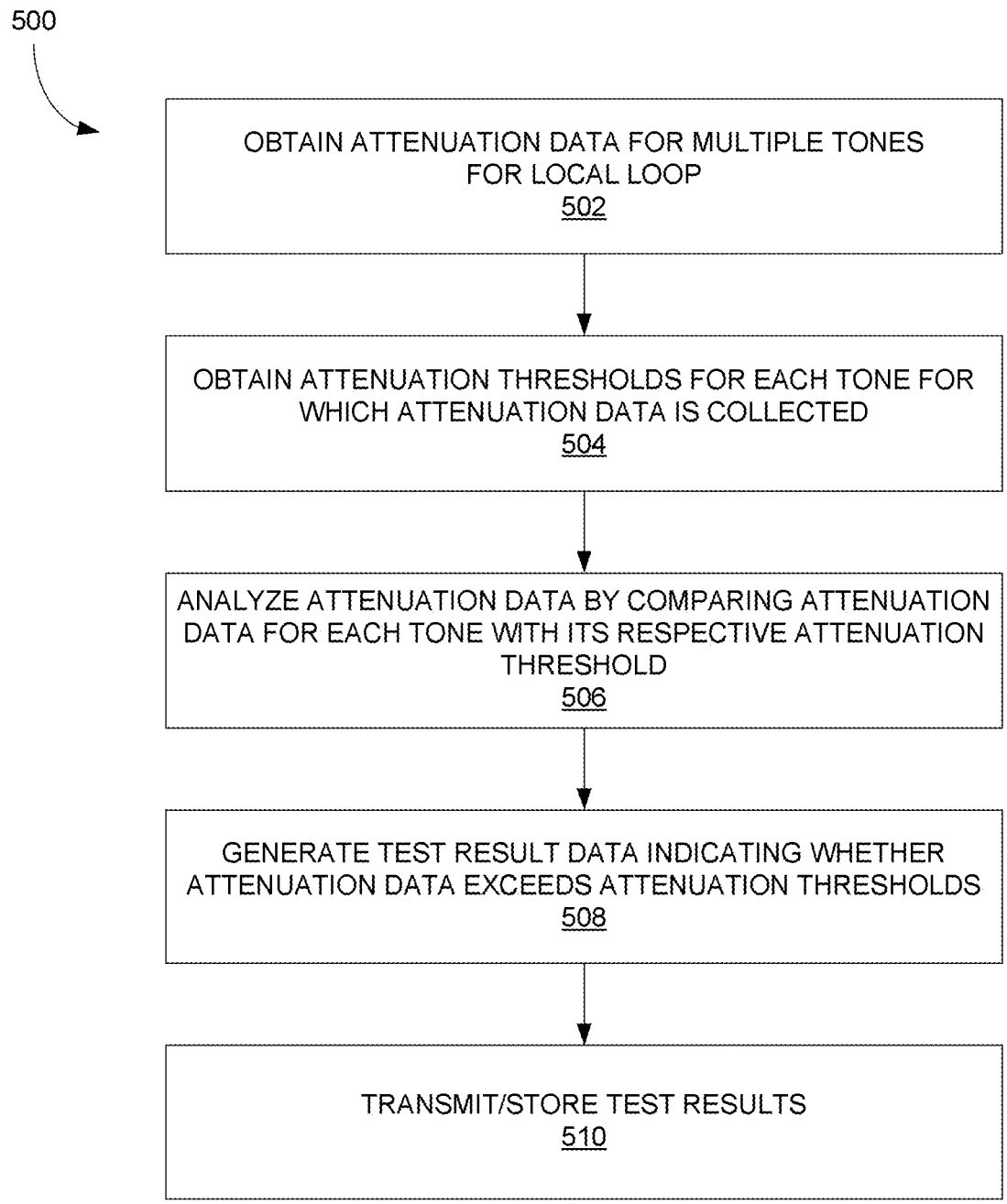
FIG. 5 illustrates a method for analyzing a local loop using attenuation data.

Referring now to FIG. 5, a flowchart 500 illustrating a method 500 for testing a local loop of a telecommunications network is provided. For purposes of the present discussion, reference is made to the network environment 100 of FIG. 1; however, it should be appreciated that implementations of the method 500 are not limited by any particular aspects of the network environment 100 specifically included in FIG. 1. Moreover, while the method 500 is discussed below as being executed by the local loop testing system 102, such an implementation is provided merely as an example and for purposes of explaining various aspects of the present disclosure. In other implementations, the method 500 may be implemented and executed, in whole or in part, by other devices within the network environment 100 or that otherwise have access to information collected from the network environment 100. For example and without limitation, the method 500 may be implemented, in whole or in part, by any of the DSLAMs 104A-104O, the premise devices 108A-108O, the portable testing unit 124, or the remote computing device 130.

At operation 502, the local loop testing system 102 obtains line performance data including attenuation data for multiple tones of one or more of the local loops 106A-106O. In general and similar to the bits-per-tone data discussed above, the local loop testing system 102 may obtain the attenuation data either directly from devices within the network environment 100 (e.g., DSLAMS 104A-104O, premise devices 108A-1800), from testing devices in communication with the local loop testing system 102 (e.g. portable testing unit 124), from a data source of historical line performance data (e.g., line performance data source 126), or in any other suitable way.

The line performance data including the attenuation data obtained in operation 502 may be in various forms and formats based on the type of device collecting the line performance data and/or the approach used to store the line performance data. However, in general, for each local loop for which line performance data is available, the line performance data includes attenuation data that indicates attenuation values for each of a set of tones carried by the local loop. For example, in certain implementations, the attenuation data may include an attenuation value measured in decibels (dB) for each of multiple tones carried by the local loop. In other implementations, the attenuation value may instead be provided in terms of effective feet of line (e.g., the length of line for which a corresponding loss would occur absent any impairments). The attenuation data may be stored and retrieved as an array, table, string, or similar data structure from which losses for specific tones may be retrieved or otherwise identified. In certain implementations, the line performance data including the attenuation data may be in a comma-separated value (CSV) file or similar tabular file format. In other implementations, the line performance data may be received as an extensible markup language (XML) file or similar format that similarly facilitates identification and extraction of particular data from the file by including specific fields identifying particular type of data, including fields for the attenuation data.

The number of tones and specific tone frequencies for which attenuation data is collected may vary; however, in general, attenuation data includes attenuation values for tones of different frequencies. In certain implementations, for example, the local loop testing system 102 may obtain attenuation data for multiple tone frequencies evenly distributed across the full frequency spectrum of the local loop. In other implementations, the local loop testing system 102 may obtain attenuation data for tone frequencies that are unevenly distributed across the frequency spectrum of the local loop. For example, the local loop testing system 102 may obtain attenuation data for tones that are more tightly clustered in frequency bands corresponding to particular impairments (e.g., low frequencies for identifying mixed technology). It should also be appreciated that the specific tone frequencies for which attenuation data is obtained may vary for a given local loop, between different local loops, etc., based on the specific testing needs of an operator of the local loop testing system 102.

In still other implementations, the local loop testing system 102 may be configured to obtain attenuation data for each of a series of predefined frequency bands. For example, as previously discussed in the context of FIG. 4, tones for a local loop may be divided into multiple upstream and downstream bands (e.g., U1/U2 and D1/D2 bands). In such cases, the local loop testing system 102 may be provided with definitions of the bands and may be configured to obtain attenuation data for a set of tones that includes at least one tone representative of each of the predefined frequency bands.

Obtaining the line performance data including the attenuation data may include transmitting a request for line performance data from the local loop testing system 102 to a network device capable of collecting such information for a local loop. For example, in the network environment 100, the local loop testing system 102 may transmit a request for line performance data for one, multiple, or all local loops associated with the DSLAM 104A. In response, the DSLAM 104A may transmit one or more corresponding response messages including the requested line performance data to the local loop testing system 102.

In certain implementations, the request message from the local loop testing system 102 may be configured to cause the receiving network device to initiate a line performance test and to collect line performance data that includes the attenuation data. In other implementations, the network device may be configured to periodically sample or otherwise collect line performance data independent of a specific request from the local loop testing system 102. In such implementations, in response to receiving a request from the impairment testing system 102, the network device may provide the most recently collected line performance data to the local loop testing system 102.

At operation 504, the local loop testing system 102 obtains a set of attenuation thresholds for use in evaluating the collected attenuation data. In certain implementations, the attenuation thresholds may be predetermined benchmarks or similar performance standards for the local loop. For example, the local loop testing system 102 may store or otherwise have access to a database containing sets of attenuation thresholds. Each set of attenuation thresholds may include maximum attenuation values, normal attenuation values, normal attenuation ranges, or any other similar values or ranges of values for assessing whether attenuation for multiple tones of the local loop are each within normal operational ranges. For example, the database may include different sets of attenuation thresholds for different combinations of line types, line lengths, target bitrates, and the like. In certain implementations, the attenuation thresholds may be provided in units of dB loss per foot such that each threshold may be scaled based on the specific length of the local loop being tested. Accordingly, in such implementations, the local loop testing system 102 may obtain the set of attenuation thresholds by performing a lookup to retrieve the particular set of attenuation thresholds corresponding to the local loop to be analyzed and performing any necessary scaling to account for the length of the local loop.

In other implementations, the attenuation thresholds may instead correspond to historical attenuation values obtained for the local loop. For example, in certain implementations, attenuation thresholds may correspond to initial attenuation values measured following installation/setup of the local loop. Similarly, the attenuation thresholds may instead correspond to attenuation values that are periodically measured/collected for the local loop. In either case, the attenuation thresholds are based on historic performance of the local loop and, as a result, can provide a specific benchmark against which subsequent attenuation values may be measured.

Similar to the attenuation data collected in operation 502, the attenuation thresholds may be expressed in various units. For example and without limitation, in certain implementations, the attenuation thresholds may be expressed as losses in dB. In other implementations, the attenuation thresholds may be expressed as equivalent or effective feet of line.

It should be appreciated that the specific tones of the loss data and the specific tones for which attenuation thresholds are available may not coincide. In such implementations, the local loop testing system 102 may generate one or more new attenuation thresholds. To do so, the local loop testing system 102 may interpolate between or extrapolate from available attenuation thresholds to calculate an attenuation threshold for any attenuation value for which an existing attenuation threshold is unavailable.

As noted above, the attenuation thresholds may be dependent on particular characteristics of the local loop being tested. Among other things, each of the line type and the line length of the local loop can impact attenuation. Accordingly, in certain implementations, the local loop testing system 102 may have access to or otherwise obtain information regarding local loops for which testing is to be conducted and may use such retrieved information to calculate attenuation thresholds. For example, when testing a particular local loop, the local loop testing system 102 may query a database of local loop information using, e.g., an identified assigned to the local loop. In response, the local loop testing system 102 may receive a line type, a line length, and other information regarding the local loop. The local loop testing system 102 may then calculate attenuation thresholds for each tone by multiplying the line length by one or more factors characterizing loss per unit of length based on the line type of the local loop and the particular tone frequency.

At operation 506, the local loop testing system 102 analyzes the attenuation data collected in operation 502. To do so, the local loop testing system 102 compares the attenuation data for each tone with the corresponding attenuation threshold for the tone obtained in operation 504. In implementations in which the attenuation thresholds correspond to maximum attenuation values, for example, the local loop testing system 102 will analyze the attenuation data to determine whether any tone represented in the attenuation data exceeds its respective attenuation threshold. Alternatively, if the attenuation thresholds instead represent normal attenuation values or normal attenuation ranges, the local loop testing system 102 may determine whether attenuation of each tone is within a tolerance about the normal attenuation value or within the normal attenuation range, respectively.

At operation 508, the local loop testing system 102 generates a test result based on the outcome of the analysis conducted during operation 506. In certain implementations, the test result may indicate, among other things, whether one or more tones exceeded their respective attenuation thresholds, the specific tones that exceeded their respective attenuation thresholds, the degree to which any attenuation thresholds were exceeded, and the like. The test results may then be transmitted and/or stored (operation 510). For example, in implementations in which the local loop testing system 102 initiates the attenuation analysis in response to a request from the portable testing unit 124 or the remote computing device 130 (which, as noted above, may correspond to a network operations center), the local loop testing system 102 may transmit the results to the portable testing unit 124 or the remote computing device 103, respectively. Alternatively, the local loop testing system 102 may transmit the test results to a database or similar data storage system for archiving and/or subsequent analysis.

The local loop testing system 102 may be configured to automatically initiate a more detailed impairment analysis in response to determining that one or more tones exceed their respective attenuation thresholds. For example, in response to determining the attenuation value for at least one tone exceeds its respective attenuation threshold, the local loop testing system 102 may automatically initiate an analysis of bits-per-tone data, as described above in the context of FIG. 2. The results of such analysis may also be incorporated into the test results of operation 508 for presentation to a user. As a result, the user may be simultaneously notified that an impairment likely exists on the local loop and may be provided with an automated diagnosis of what type of impairment is likely present.

In addition to the applications previously discussed herein, the test results and data generated by the local loop testing system 102 (including any tests results or data generated during testing for impairments or attenuation-based testing, as described herein) may be used by additional systems for various purposes. In one non-limiting example, the impairment and/or attenuation-related data may be accessed and used by a map generation tool to generate overlays or similar graphical elements. For example, the map generation tool may be configured to generate maps illustrating local loops within a geographic region. Based on the test results/data generated by the local loop testing system 102, the map generation tool may then color-code or otherwise visually differentiate each depicted local loop according to the presence of any impairments, the severity of any identified impairments, the magnitude of losses for the local loop, the degree to which losses for a loop deviates from expected/inherent loss, and or any other similar metric. A user may then be able to select a displayed local loop and drill-down to further review the underlying test results/data.

The description and illustrations of the local loop testing system 102 contained herein are not intended to be limiting. For example, the local loop testing system 102 may include a plurality of hardware, software, and/or firmware components operating together to provide the functionality attributed herein to the local loop testing system 102. For example, the local loop testing system 102 may be implemented, at least in part, by a cloud of computing platforms operating together to provide at least some of the functionality described herein as being performed by the local loop testing system 102. Similarly, the local loop testing system 102 may be in communication with one or more computing devices configured to perform at least a portion of the functionality described herein and attributed to the local loop testing system 102. For example, the local loop testing system 102 may be configured to obtain line performance data and to forward such data to a computing device communicatively coupled to the local loop testing system 102 to perform testing and analysis of the line performance data, including the bits-per-tone data contained therein. Accordingly, any functions described herein as being performed by the local loop testing system 102 instead by implemented in machine-readable instructions of a computing device in communication with the local loop testing system 102.

Some or all of the operations of steps described above as being performed by the local loop testing system 102 (e.g., the various operations included in the method 200 of FIG. 2 or method 500 of FIG. 5) may instead be performed by other devices including, without limitation, the DSLAM 104A, the portable testing unit 124, and the premise device 108B. For example, in one implementation, the DSLAM 104A may execute instructions to periodically collect and test line performance data to detect impairments. In response to detecting an impairment, the DSLAM 104A may transmit a notification, e.g., to the remote computing device 130, indicating the impairment such that remedial actions may be taken. Such applications of the present disclosure can be particularly advantageous in facilitating automated monitoring of local loops while significantly reducing the need for technicians and similar personnel to physically travel to and test particular local loops. Similar monitoring functionality may also be implemented in premise devices associated with particular local loops.

In another implementation, the testing functionality described herein may be implemented in the portable testing unit 124. For example, the portable testing unit 124 may be configured to probe a local loop to collect line performance data, generate a bit value string from bits-per-tone data included in the line performance data, test the bit value string using various bit value templates stored in memory of the portable testing unit 124, and to present test results to a user, e.g., on a display of the portable testing unit 124. As a result, the portable testing unit 124 may be substantially self-sufficient and capable of testing for impairments in local loops without requiring communication with a remote computing system, such as the local loop testing system 102 of FIG. 1.

Figure 6:
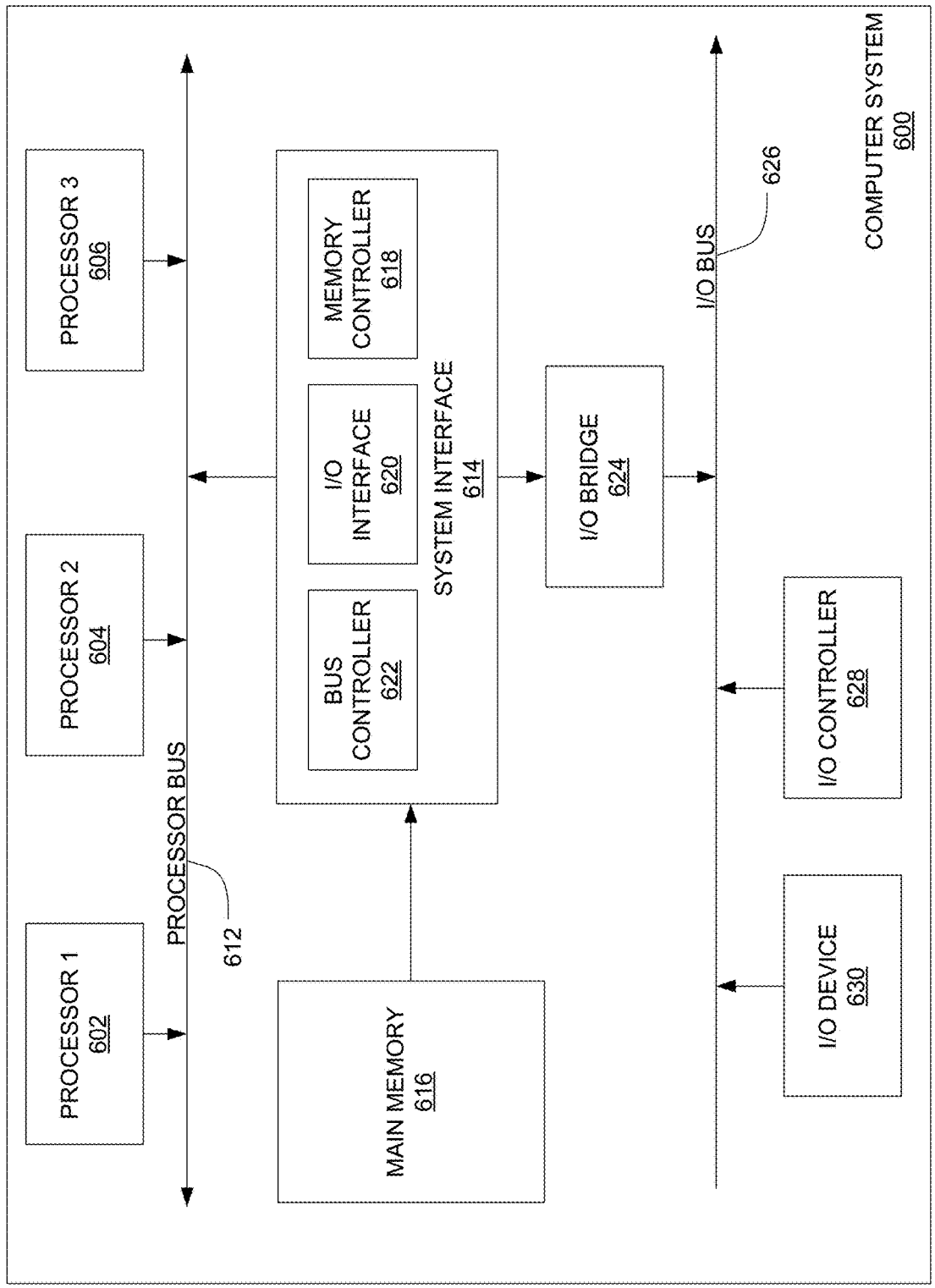
FIG. 6 is a block diagram illustrating an example of a computing device or computer system which may be used in implementations of the present disclosure

FIG. 6 is a block diagram illustrating an example of a computing device or computer system 600 which may be used in implementations of the present disclosure. In particular, the computing device of FIG. 6 is one embodiment of any of the devices that perform one of more of the operations described above. For example, such devices may include any of the devices of the network environment 100 illustrated in FIG. 6 and, in particular, any of the local loop testing system 102, the DSLAMs 104A-1040, the premise devices 108A-1080, the portable testing unit 124, and the remote computing device 130.

The computer system 600 includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one implementation, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of a machine-readable media may include, but is not limited to, magnetic storage media; optical storage media (e.g., CD-ROM); magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The steps may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for automatically analyzing local loops of telecommunications networks, the system comprising:
    one or more hardware processors configured by machine-readable instructions to:
    obtain bits-per-tone data for a local loop of a telecommunications network, the bits-per-tone data including a plurality of tones and respective bit counts for each of the plurality of tones;
    generate a bit value string from the bits-per-tone data, the bit value string including the bit counts of the bits-per-tone data; and
    determine whether the bit value string includes a bit pattern indicative of an alien ingress in the local loop, wherein the bit pattern includes a series of bit counts of zero disposed between adjacent bit counts of greater than zero.

2. The system of claim 1, wherein the local loop is coupled to a port of a digital subscriber line access multiplexer (DSLAM), and to obtain the bits-per-tone data includes receiving the bits-per-tone data from the DSLAM.

3. The system of claim 1, wherein to obtain the bits-per-tone data includes receiving the bits-per-tone data from a portable testing unit coupled to the local loop.

4. The system of claim 3, wherein the one or more hardware processors are further configured by machine-readable instructions to transmit a result to the portable testing unit, the result indicating whether the impairment is present in the local loop and configured to cause the portable testing unit to automatically display the result in response to receiving the result.

5. The system of claim 1, wherein the bit value string comprises hexadecimal values representing the bit counts for each of the plurality of tones arranged in order of tone frequency.

6. The system of claim 1, wherein the one or more hardware processors are further configured by machine-readable instructions to:
    obtain secondary data for the local loop; and
    verify whether the impairment is in the local loop using the secondary data.

7. A method of automatically analyzing local loops of telecommunications networks, the method comprising:
    obtaining bits-per-tone data for a local loop of a telecommunications network, the bits-per-tone data including a plurality of tones and respective bit counts for each of the plurality of tones;
    generating a bit value string from the bits-per-tone data, the bit value string including the bit counts of the bits-per-tone data; and
    determining whether the bit value string includes a bit pattern indicative of an alien ingress in the local loop, wherein the bit pattern includes a series of bit counts of zero disposed between adjacent bit counts of greater than zero.

8. The method of claim 7, wherein obtaining the bits-per-tone data comprises receiving the bits-per-tone data from a digital subscriber line access multiplexer (DSLAM), the local loop coupled to a port of the DSLAM.

9. The method of claim 7, wherein obtaining the bits-per-tone data further comprises receiving the bits-per-tone data from a portable testing unit coupled to the local loop and the method further includes transmitting a result to the portable testing unit, the result indicating whether the impairment is present in the local loop.

10. The method of claim 7, wherein generating the bit value string comprises generating a string of hexadecimal values representing the bit counts for each of the plurality of tones arranged in order of tone frequency.

11. The method of claim 7, further comprising:
    obtaining secondary data for the local loop; and
    verifying whether the impairment is in the local loop using the secondary data.

12. A tangible, non-transitory, computer-readable media having instructions encoded thereon, the instructions, when executed by a processor, are operable to:
    obtain bits-per-tone data for a local loop of a telecommunications network, the bits-per-tone data including a plurality of tones and respective bit values for each of the plurality of tones;
    generate a bit value string from the bits-per-tone data, the bit value string including the bit values of the bits-per-tone data; and
    determine whether the bit value string includes a bit pattern indicative of an alien ingress in the local loop, wherein the bit pattern includes a series of bit counts of zero disposed between adjacent bit counts of greater than zero.

13. The computer-readable media of claim 12, wherein the instructions are further operable to obtain the bits-per-tone data by receiving the bits-per-tone data from a digital subscriber line access multiplexer (DSLAM) the local loop coupled to a port of the DSLAM.

14. The computer-readable media of claim 12, wherein the instructions are further operable to obtain the bits-per-tone data by receiving the bits-per-tone data from a portable testing unit coupled to the local loop.

15. The computer-readable media of claim 14, wherein the instructions are further operable to transmit a result to the portable testing unit, the result indicating whether the impairment is present in the local loop and configured to cause the portable testing unit to automatically display the result in response to receiving the result.

16. The computer-readable media of claim 12, wherein the bit value string comprises a string of hexadecimal values representing the bit counts for each of the plurality of tones arranged in order of tone frequency.

* * * * *